United States Patent
Koskela et al.

(10) Patent No.: US 9,198,137 B2
(45) Date of Patent: Nov. 24, 2015

(54) NETWORK CONTROLLED FILTERING OVER WIRELESS DEVICE COMMUNICATIONS

(75) Inventors: Timo K. Koskela, Oulu (FI); Sami-Jukka Hakola, Kempele (FI); Samuli Turtinen, Ii (FI); Jussi Ojala, Helsinki (FI)

(73) Assignee: BROADCOM CORPORATION, Irvine, CA (US)

( * ) Notice: Subject to any disclaimer, the term of this patent is extended or adjusted under 35 U.S.C. 154(b) by 158 days.

(21) Appl. No.: 13/193,055

(22) Filed: Jul. 28, 2011

(65) Prior Publication Data

US 2013/0028177 A1     Jan. 31, 2013

(51) Int. Cl.
*H04L 12/28* (2006.01)
*H04J 3/26* (2006.01)
*H04W 74/00* (2009.01)
(Continued)

(52) U.S. Cl.
CPC ............ *H04W 52/146* (2013.01); *H04W 4/005* (2013.01); *H04W 52/281* (2013.01); *H04W 52/325* (2013.01)

(58) Field of Classification Search
CPC . H04W 52/146; H04W 4/005; H04W 52/281; H04W 52/325
USPC ......... 370/328, 338, 252, 331, 295, 389, 312, 370/390, 392, 432; 375/260, 299; 455/445, 455/519, 522
See application file for complete search history.

(56) References Cited

U.S. PATENT DOCUMENTS 6,349,091 B1    2/2002  Li
7,411,548 B2 *  8/2008  Lommen ...................... 342/386
(Continued)

FOREIGN PATENT DOCUMENTS

| CN | 101631358 A      | 1/2010 |
|----|------------------|--------|
| WO | WO-2008/031057 A2 | 3/2008 |
| WO | WO-2011/028843 A2 | 3/2011 |

OTHER PUBLICATIONS

"Earthquake and Tsunami Warning System", http://4.bp.blogspot.com/_WI/SXT08PCNTzI/AAAAAAAABKU/o0wfok41140/s1600-h/3GPP_ETWS.jpg; Jul. 6, 2011, 1 pg.

(Continued)

*Primary Examiner* — Alpus H Hsu
*Assistant Examiner* — Camquyen Thai
(74) *Attorney, Agent, or Firm* — Oblon, McClelland, Maier & Neustadt, L.L.P.

(57) ABSTRACT

There is stored in a memory an association between each $n^{th}$ one of N content types with a respective $n^{th}$ group of N groups of identifiers (N is an integer greater than one, n indexes from 1 to N, and at least one of the groups has more than one identifier). A beacon sender selects one of the content types for a beacon to be transmitted and selects a beacon identifier from the group associated with the selected content type. The beacon to be transmitted is compiled to include content of the selected content type and the selected beacon identifier. The beacon receiver selects at least one of the content types; and for a plurality of beacons received, filters out from further processing each beacon having a beacon identifier that is not within the group of identifiers associated with any of the at least one selected content types. The network creates the association and broadcasts it in a network cell.

20 Claims, 6 Drawing Sheets

(51) Int. Cl.
    *H04B 7/00*      (2006.01)
    *H04W 52/14*     (2009.01)
    *H04W 4/00*      (2009.01)
    *H04W 52/28*     (2009.01)
    *H04W 52/32*     (2009.01)

(56)         References Cited

U.S. PATENT DOCUMENTS

| | | | |
|---|---|---|---|
| 7,613,475 B2* | 11/2009 | Song et al. | 455/522 |
| 7,817,961 B2* | 10/2010 | Sinivaara et al. | 455/41.2 |
| 7,830,250 B2* | 11/2010 | Huseth et al. | 340/539.13 |
| 7,929,501 B2* | 4/2011 | Leonidov et al. | 370/335 |
| 7,995,527 B2* | 8/2011 | Li et al. | 370/329 |
| 8,199,051 B2* | 6/2012 | Anderson et al. | 342/357.31 |
| 8,237,612 B2* | 8/2012 | Lin et al. | 342/451 |
| 8,280,355 B1* | 10/2012 | Jones | 455/414.1 |
| 2002/0002034 A1 | 1/2002 | Davies et al. | 455/41 |
| 2004/0095880 A1* | 5/2004 | Laroia et al. | 370/208 |
| 2004/0213185 A1* | 10/2004 | Oh et al. | 370/335 |
| 2007/0242647 A1* | 10/2007 | Bennett | 370/338 |
| 2007/0242765 A1* | 10/2007 | Parizhisky et al. | 375/260 |
| 2008/0062929 A1* | 3/2008 | Leonidov et al. | 370/331 |
| 2008/0240055 A1 | 10/2008 | Dean et al. | 370/338 |
| 2008/0279214 A1 | 11/2008 | Doi et al. | |
| 2009/0016248 A1 | 1/2009 | Li et al. | 370/310.1 |
| 2009/0059919 A1* | 3/2009 | Kim et al. | 370/389 |
| 2009/0067397 A1 | 3/2009 | Seok | 370/338 |
| 2009/0074094 A1* | 3/2009 | Palanki et al. | 375/260 |
| 2009/0097440 A1 | 4/2009 | Sakoda | |
| 2010/0202354 A1* | 8/2010 | Ho | 370/328 |
| 2010/0329232 A1* | 12/2010 | Tubb et al. | 370/345 |
| 2011/0047032 A1 | 2/2011 | Kumar et al. | 705/14.66 |
| 2011/0130149 A1 | 6/2011 | Yao et al. | |
| 2011/0148699 A1 | 6/2011 | Anderson et al. | 342/357.31 |
| 2011/0317569 A1* | 12/2011 | Kneckt et al. | 370/252 |
| 2012/0001728 A1* | 1/2012 | Janiszewski | 340/8.1 |
| 2012/0120931 A1 | 5/2012 | Abraham et al. | |
| 2012/0327862 A1 | 12/2012 | Lee et al. | |

OTHER PUBLICATIONS

"On the need for a 3GPP study on LTE device-to-device discovery and communication", Qualcomm Incorporated, 3GPP TSG-RAN #52, Tdoc-RP-110706, May-Jun. 2011, 2 pgs.

"Study on LTE Device to Device Discovery and Communication—Radio Aspects", TSG-RAN #52.Tdoc RP-110707, 5 pgs.

"Study on LTE Device to Device Discovery and Communication—Service and System Aspects", TSG-RAN #52, Tdoc RP-110708, May-Jun. 2011, 5 pgs.

"MAC filtering", http://en.wikipedia.org/wiki/MAC_filtering; Jul. 6, 2011, 1 pg.

"Future of Wireless? The Proximate Internet", Rajiv Laroia, COMSNETS, Jan. 7, 2010, 38 pgs.

* cited by examiner

NETWORK CONTROLLED FILTERING OVER WIRELESS DEVICE COMMUNICATIONS

TECHNICAL FIELD

The exemplary and non-limiting embodiments of this invention relate generally to wireless communication systems, methods, devices and computer programs and, more specifically, relate to network-directed filtering of user communications such as for example machine-to-machine or device-to-device communications directly between mobile nodes.

BACKGROUND

The following abbreviations that may be found in the specification and/or the drawing figures are defined as follows:
 3GPP third generation partnership project
 AP access point
 BSS basic service set
 D2D device to device
 eNB evolved NodeB
 IBSS independent basic service set
 ID identification, identifier
 IEEE Institute of Electrical and Electronics Engineers
 ISM industrial, scientific, medical
 LTE long term evolution (evolved UTRAN)
 M2M machine to machine
 MAC medium access control
 RAT radio access technology
 RNTI radio network temporary identifier
 SFN system frame number
 STA station
 UE user equipment
 UTRAN universal terrestrial radio access network
 WLAN wireless local area network In the wireless communication arts there has been increasing research into D2D communications in which portable radio devices (two or more) form their own ad hoc network to communicate directly with one another without having to send their data through a conventional (cellular) network. M2M is a subset of D2D in that the M2M communications are typically between un-manned user devices, such as remotely mounted sensors and data collection/aggregation nodes which collect and analyze data from several such sensors for event-based reporting of abnormal conditions. Typically M2M devices will have lesser processing power than their user-operated D2D companions but sometimes need not rely on a temporary power source (unlike a UE radio which relies on a battery for portable power). The following discussion of D2D includes the M2M subset unless specifically noted otherwise.

In some implementations the radio spectrum these D2D devices use for their D2D communications lies in the unlicensed frequency bands, such as the ISM band in which WLAN communications occur or what is known as television whitespaces. In others it lies in a cellular band, either from opportunistic use of spectrum 'holes' the mobile devices find and exploit while avoiding interference to the primary (conventional cellular) users on that licensed band, or by being allocated certain radio resources by the cellular network itself for their D2D communications. In any of these the cellular network might exercise some varying level of control over the D2D communications in order to assure a more efficient use of the limited radio spectrum.

Figure 1:
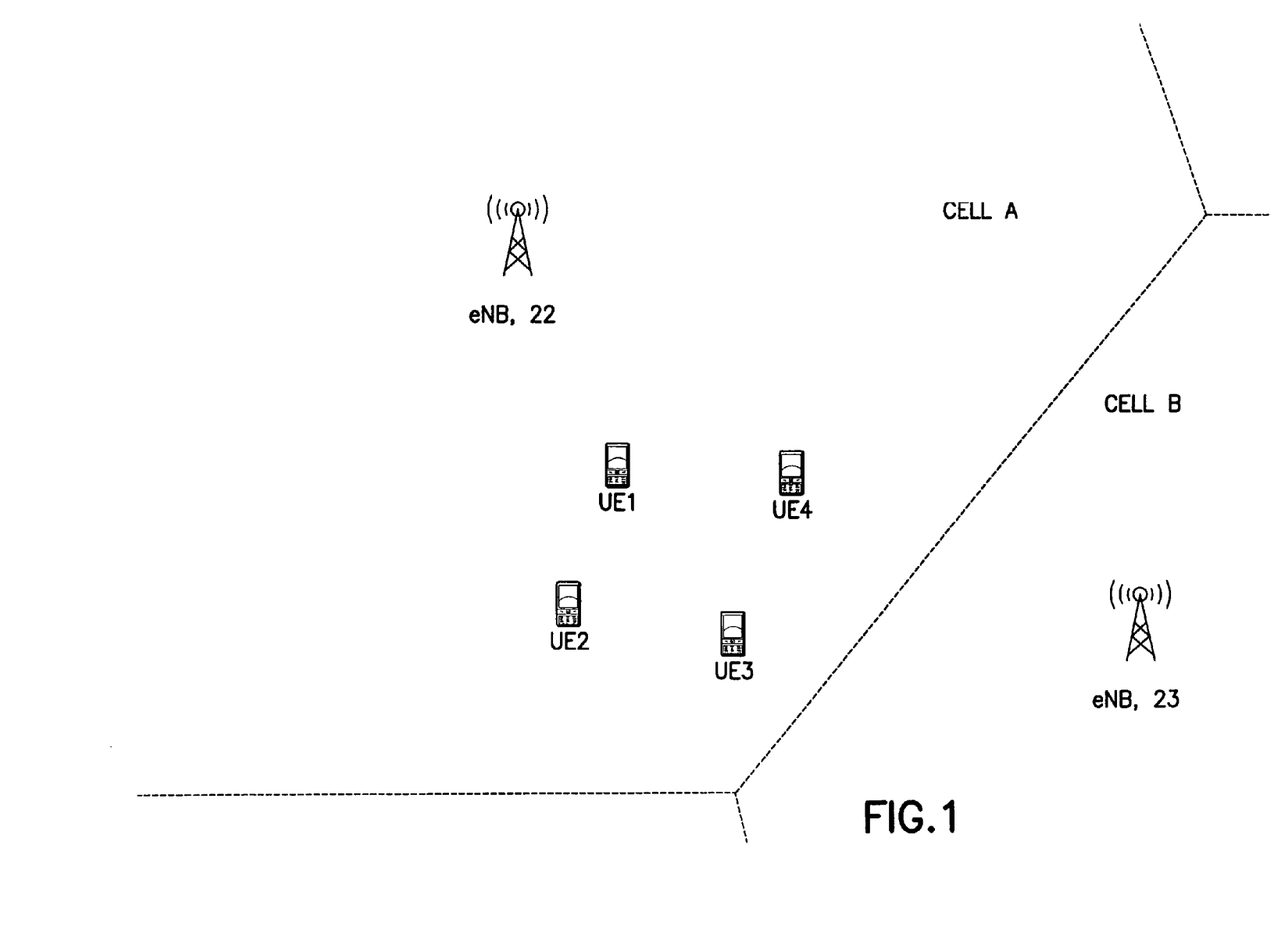
FIG. 1 is a schematic diagram showing a radio environment with a group of four UEs under one cell A and adjacent to another cell B, in which exemplary embodiments detailed herein may be practiced to advantage.

FIG. 1 illustrates an exemplary wireless environment in which embodiments of these teachings may be practiced to advantage. Cell A is a cellular region in which UEs operating on the licensed band are controlled by an eNB 22, and is adjacent to cell B which is controlled by eNB 23. Near the border there is a cluster of UEs (UE1, UE2, UE3, UE4) which seek to engage in D2D communications.

In conventional infrastructure mode WLAN each UE not operating as the AP for the group would be associated to a given AP by responding to the AP's beacon requesting to associate to the AP's group, termed a BSS. The AP coordinates communications, some of which may be D2D, and also provides the UEs (termed non-AP STAs in WLAN) with connectivity to a broader network such as the Internet. In conventional ad hoc mode WLAN there is no AP and so no AP's beacon to which the STAs can associate. In this case one of the STAs takes on some limited functions of the AP by transmitting its own beacon using an IBSS ID it selects; the other STAs join that IBSS and the joined devices can then engage in D2D communications. Unlike the infrastructure mode, the D2D devices in the ad hoc mode must discover one another without the aid of a centralized AP to which all interested devices in the area are associated.

D2D is not nearly as ubiquitous as other communication techniques, but it is anticipated that some proximity-based or location-based applications might be added to broaden its usability. See for example document Tdoc RP-110706 entitled ON THE NEED FOR A 3GPP STUDY ON LTE DEVICE-TO-DEVICE DISCOVERY AND COMMUNICATION; Tdoc RP-110707 entitled STUDY ON LTE DEVICE TO DEVICE DISCOVERY AND COMMUNICATION—RADIO ASPECTS; and Tdoc-RP-110708 entitled STUDY ON LTE DEVICE TO DEVICE DISCOVERY AND COMMUNICATION—SERVICE AND SYSTEM ASPECTS (each from 3GPP TSG-RAN #52; Bratislava, Slovakia; 31 May to 3 Jun. 2011; by Qualcomm Inc.).

In the inventors' view D2D in its current state is not seen to be well adapted for very wide adoption; the current protocols for device discovery in the radio/physical layer may tend to flood the higher layers (MAC and L1 layers) if the lower radio/physical layers have to pass all the D2D discovery signaling they detect to the upper layers for processing and decision making. If D2D were more common the devices seeking to join an ad hoc IBSS would be scanning and reading many beacons which they then disregard after decoding and deciding that they choose not to join. The IEEE 802.11mb specifications which give the beacon frame format note that the beacon frame is a subtype of a management frame, and that the beacon frame origins are separated by the BSS/IBSS ID field and the sender's MAC address field, both in the header. Additionally, the current D2D protocols do not seem to support proximity-based or location-based applications as the above 3GPP documents seek.

SUMMARY

The foregoing and other problems are overcome, and other advantages are realized, by the use of the exemplary embodiments of this invention.

In a first exemplary embodiment of the invention there is a method comprising: storing in a computer readable memory an association between each $n^{th}$ one of N content types with a respective $n^{th}$ group of N groups of identifiers, in which N is an integer greater than one, n indexes from 1 to N, and at least one of the groups has more than one identifier; selecting one of the content types for a beacon to be transmitted and selecting a beacon identifier from the group associated with the selected content type; and compiling the beacon to be transmitted to include content of the selected content type and the selected beacon identifier.

In a second exemplary embodiment of the invention there is an apparatus comprising a processing system comprising at least one processor and a memory storing a set of computer instructions. In this embodiment the processing system is arranged to at least: store in the memory an association between each $n^{th}$ one of N content types with a respective $n^{th}$ group of N groups of identifiers, in which N is an integer greater than one, n indexes from 1 to N, and at least one of the groups has more than one identifier; select one of the content types for a beacon to be transmitted and select a beacon identifier from the group associated with the selected content type; and compile the beacon to be transmitted to include content of the selected content type and the selected beacon identifier.

In a third exemplary embodiment of the invention there is a computer readable memory tangibly storing a computer program that is executable by at least one processor. In this embodiment the computer program comprises: code for storing in a computer readable memory an association between each $n^{th}$ one of N content types with a respective $n^{th}$ group of N groups of identifiers, in which N is an integer greater than one, n indexes from 1 to N, and at least one of the groups has more than one identifier; code for selecting one of the content types for a beacon to be transmitted and selecting a beacon identifier from the group associated with the selected content type; and code for compiling the beacon to be transmitted to include content of the selected content type and the selected beacon identifier.

In a fourth exemplary embodiment of the invention there is a method comprising: storing in a computer readable memory an association between each $n^{th}$ one of N content types with a respective $n^{th}$ group of N groups of identifiers, in which N is an integer greater than one, n indexes from 1 to N, and at least one of the groups has more than one identifier; selecting at least one of the content types; and for a plurality of beacons received, filtering out from further processing each beacon having a beacon identifier that is not within the group of identifiers associated with any of the at least one selected content types.

In a fifth exemplary embodiment of the invention there is an apparatus comprising a processing system comprising a memory storing a computer program and at least one processor. In this embodiment the processing system is arranged to at least: store in the memory an association between each $n^{th}$ one of N content types with a respective $n^{th}$ group of N groups of identifiers, in which N is an integer greater than one, n indexes from 1 to N, and at least one of the groups has more than one identifier; select at least one of the content types; and for a plurality of beacons received, filter out from further processing each beacon having a beacon identifier that is not within the group of identifiers associated with any of the at least one selected content types.

In a sixth exemplary embodiment of the invention there is a memory tangibly storing a computer program that is executable by at least one processor. In this embodiment the computer program comprises: code for storing in the memory an association between each $n^{th}$ one of N content types with a respective $n^{th}$ group of N groups of identifiers, in which N is an integer greater than one, n indexes from 1 to N, and at least one of the groups has more than one identifier; code for selecting at least one of the content types; and for a plurality of beacons received, code for filtering out from further processing each beacon having a beacon identifier that is not within the group of identifiers associated with any of the at least one selected content types.

In a seventh exemplary embodiment of the invention there is a method comprising: creating, and storing in a computer readable memory, an association between each $n^{th}$ one of N content types and a respective $n^{th}$ group of N groups of identifiers, in which N is an integer greater than one, n indexes from 1 to N, and at least one of the groups has more than one identifier; and broadcasting the association in a network cell.

In a eighth exemplary embodiment of the invention there is an apparatus comprising a processing system comprising a memory storing a computer program and at least one processor. In this embodiment the processing system is arranged to at least: create, and store in the memory, an association between each $n^{th}$ one of N content types and a respective $n^{th}$ group of N groups of identifiers, in which N is an integer greater than one, n indexes from 1 to N, and at least one of the groups has more than one identifier; and broadcast the association in a network cell.

In a ninth exemplary embodiment of the invention there is a memory tangibly storing a computer program that is executable by at least one processor. In this embodiment the computer program comprises: code for creating, and for storing in the memory, an association between each $n^{th}$ one of N content types and a respective $n^{th}$ group of N groups of identifiers, in which N is an integer greater than one, n indexes from 1 to N, and at least one of the groups has more than one identifier; and code for broadcasting the association in a network cell.

DETAILED DESCRIPTION

In the environment of FIG. 1 consider that the D2D communications are under some management control by the eNB 22. In order to first establish D2D communications with the other UEs, UE1 will send a beacon broadcasting its IBSS to which the others can join. According to exemplary embodiments of these teachings, the UE1 will select a beacon ID to be disposed within that beacon it transmits which indicate the type of contents of that beacon frame. The network (eNB 22) manages how this occurs by designating certain beacon IDs for the different types of information. The network may choose to group the beacon IDs in any number of ways; leading integer or triplet of digital values, trailing integer/triplet, a simple mathematical operation on the beacon ID, and the like. For simplicity of explaining the concept the examples below group sequential beacon ID values to the same type of beacon content.

For example, if K is an arbitrary constant integer the network may designate beacon IDs as follows:

D2D control information has ID range from K to K+10;

D2D device discovery information has the ID range from K+11 to K+20;

D2D unicast/multicast information has the ID range from K+21 to K+30;

D2D commercial advertising has the ID range K+31 to K+40;

M2M data has the ID range of K+41 to K+50;

Etc.

The eNB 22 distributes this information in the cell A, such as for example including it in the eNB's broadcast system information which the D2D devices UE1 through UE4 can listen to even while in a cellular inactive mode in the cell A (such as the idle mode or registration area/location area tracking mode). Therefore if UE1 seeks to check whether there are other devices in the area with which it would like to engage in D2D communications it can select one of the beacon IDs between K+11 through K+20 and insert the selected value within a new beacon frame UE1 broadcasts. UE1 will be sending this beacon for device discovery purposes and so it has relevant broadcast information which enables other devices UE2, UE3, UE4 to pair with UE1. Other types of beacon frames might have control information such as channel allocations or transmit durations, unicast or multicast data, or even commercial advertisements from vendors/shop owners in the local area of the D2D devices to inform those devices of the vendor's presence or some special offer. The beacon sending UE1 can select any beacon ID within the network-defined range of IDs which is not already in use in the local area; UE1 can check beacon ID availability by monitoring the airwaves to see if any other beacon IDs within the network-defined range are currently being used.

Any of the other UEs which are also seeking to pair with a D2D device may then fully process (decode and read) only the beacons they see whose beacon ID is within the range K+11 through K+20, and disregard all others which have beacon IDs corresponding to any other content type. It may be that UE4 does not recognize UE1 as a trusted D2D partner and so will not pair with it, but regardless the association of specific beacon IDs with only one category of beacon contents enable UE4 to ignore all other beacons whose beacon ID is not associated with the device discovery type of content. This saves UE4 battery power and processing capacity in that it does not have to decode and read all of the other beacons in the area, only process the beacon ID fields first to see if the whole beacon might be relevant. Since the location of the beacon ID field within the beacon and the ID ranges of the specific categories/content types are known in advance to the UEs, the D2D UE can filter the beacon messages it hears based on the ID range.

In the embodiment above it is the eNB 22 which selects the specific beacon ID values which are associated with the different categories. In another embodiment of these teachings the beacon ID values are fixedly associated with a beacon content type and all network cells will use the same IDs associated to the same beacon content type. This may be implemented by stipulating in a published D2D wireless standard the specific beacon ID values that are associated to the various content types. Regardless, the ID values are associated to the content types by the network, and so it may be considered that the network configures filtering by the UEs which receive the beacon since they will filter by content type.

This is particularly valuable for M2M devices which normally have lesser processing capacity. In one embodiment there is a range of beacon IDs specifically associated with M2M data to facilitate power savings at any M2M devices that may be operating in the area, power savings over and above those achieved by enabling these M2M devices to ignore unrelated beacons after reading only the beacon ID field.

From the above description it is clear that the network is configuring the filtering parameters for the beacon-receiving D2D devices, since the network sets the beacon IDs per category and the receiving devices filter the beacons they receive according to the beacon IDs. But in an embodiment the network also configures filtering parameters for the beacon-transmitting D2D devices.

For example, if we assume that the eNBs 22, 23 in FIG. 1 are home eNBs which cover a much smaller area within a LTE macro cell, then the network (macro cell or above) may associate one range of beacon IDs K+11 to K+15 with the device discovery content type for HeNB 22 and a different range K+16 to K+20 of beacon IDs with the device discovery type for HeNB 23. HeNB 22 would inform the UEs in its area via its broadcast system information that beacon IDs K+11 to K+15 are for device discovery content while simultaneously HeNB 23 would do similarly for beacon IDs K+16 to K+20. UE4 lies near the border of HeNB 22 and HeNB 23 and can read both their system information broadcasts. In the above example UE4 can know, from hearing some beacon with beacon ID selected from the set {K+11 to K+15}, that the beacon sending UE1 is nearer to HeNB 22 than to HeNB 23. In this manner the beacon ID can be used to intrinsically give location or proximity information of the sending device.

The above is but one simple example. Other ways if making location information inherent in the beacon ID groups is to make the beacon ID groups related to the network cell ID by a simple mathematical formula. In another embodiment the beacon ID groups are related to the uplink or downlink pathloss that the beacon sending device sees with respect to the network cell. An example of this is that the UE is expected to choose a progressively lower value within the designated beacon ID range when it sees progressively higher pathloss (lowest beacon ID in the range for near maximum pathloss). The receiving device interprets the beacon ID value that it reads as the sending device being further from that network cell than if the beacon ID were higher within the range). These are but a few examples of how location or proximity information can be intrinsic with the beacon ID value, and any given implementation may use one of the above examples or a combination of them.

Another way for the network to impose filtering on the beacon-sending side is to reserve certain beacon IDs for emergency or other high priority service, and then allow only certain devices to use those beacon IDs while restricting all others. So for example if beacon IDs K+51 to K+53 were reserved for emergency weather alerts and/or abducted children alerts (known as Amber alerts in the US), the network might restrict only fixed devices with certain cell IDs to use them in beacons those devices transmit. Being relatively rare other beacon receiving devices would sacrifice little in the way of battery and processing power if they also filtered in beacons bearing those restricted beacon IDs rather than filtering them out.

Any of the above implementations may be supplemented with transmit power limits for the different beacon ID ranges. In the above emergency beacon example beacons bearing an ID selected from the smaller ID range K+51 to K+53 would be transmitted at a higher power, while beacons carrying commercial advertising and having an ID selected from K+31 to K+40 would be transmitted with a low power (for example, with a range on the order of tens of meters). More routine but important D2D beacons, such as for device discovery (K+11 to K+20) and control information for initial pairing of already-discovered D2D devices (K to K+10) would be sent with a medium power between the above two. In these implementations there is a transmit power range associated with a group of beacon IDs which are in turn associated with content of the underlying beacon frame.

In the above description, the network configures the filtering of beacons based on the type of content of the beacon. In an exemplary embodiment the network can configure further filters for the D2D devices by setting filtering triggers which are based on the beacon ID. So for example if the beacon ID is value Y then the beacon-sending and/or the beacon receiving UE applies an additional beacon filter for beacons with IDs between H and J.

The following examples show the network signaling the parameters for such further filters for the beacon-sending device. If for example there is a multicell configuration such as is shown at FIG. 1 with cells A and B, it may be useful to synchronize the beacon-sending device's (UE1) transmit power for a beacon bearing a given beacon ID and the resource allocations (assuming the case in which the D2D communications use radio resources allocated by the network/eNB 22). In this case the certain beacon IDs are mapped to certain radio resources and so the specific beacon ID in the transmitted beacon maps to a specific radio resource, similar to an allocated uplink or downlink resource mapping to another resource on which the acknowledgement or negative acknowledgement is sent. The network/eNB 22 can then signal parameters to the beacon-sending device UE1 which the beacon sending device UE1 can use to derive the transmit power for any beacon which has a beacon ID in the ID range that are reserved for the content type. In this manner, if there were other UEs in cell B of FIG. 1 which might choose the same beacon ID for their beacon as does UE1 in cell A, then the devices in the different cells will transmit their respective beacons which bear the same beacon ID with different transmit powers. The network is then able to control transmit powers of various beacons; for example enforcing a low transmit power for commercial advertisements sent by devices near the eNB.

As a specific example, for time interval T1 UE1 would transmit its beacon with high transmit power and the UE in cell B would transmit its beacon with low power, and for a next succeeding time interval T2 the UE1 in cell A would transmit its beacon with low power while the UE in cell B would transmit its beacon with high power. So even if these two UEs, which are not coordinating which beacon ID they choose, happen to choose the same beacon ID and also happen to transmit a same-content-type beacon at the same time, they are differentiated by the transmit power distinction. Or the UE which sees it will transmit with low power will delay its transmission until the time interval in which it can transmit at high power. In one example this time-varying transmit power computation may be implemented by applying a function to the system frame number which is common across the different cells A and B. One such function is a modulo operation, for example SFN mod X in which X is an integer value specific to the different cells A and B. In this manner the beacons with certain beacon ID or beacon ID range can be transmitted only in certain sub-frames, so for example if a given beacon ID or ID range is tied to X=10, the beacon can be transmitted only in every $10^{th}$ sub-frame. The values of X and the range of beacon IDs associated with a given X value can be fixed (for example, set forth in a published wireless protocol) or it can be configurable by the network/eNB 22.

In an exemplary embodiment the beacon also informs the beacon-receiving UE (UE2, UE3, UE4) of what the transmit power was. In one embodiment the transmit power is indicated explicitly in the beacon itself. An alternative embodiment saves signaling bits; the transmit power information is comparative only (low, medium or high for example without specific quantization) and the transmit power indication is implicit within the beacon message, or more specifically within the beacon ID of the beacon. Recall that it was detailed above that different content-types have different transmit powers associated with them. In this embodiment of implicitly indicating the transmit power in the beacon, there are different powers associated with different beacon IDs within the ID range of one beacon content-type. As a specific example, if the beacon is to have device discovery type contents for which the reserved beacon ID range is K+11 to K+20, the beacon-sending UE1 will select from among K+11 to K+13 if it is to send the beacon with low power, and from among K+18 to K+20 if it is to send the beacon with high power, and from among K+14 to K+17 if it is to send the beacon with medium power. This implicit indication ties the beacon ID for a particular content type to the transmit power. Indicating the transmit power in the beacon itself, either explicitly or implicitly, enables the beacon-receiving UEs (UE2, UE3, UE4) to estimate their distance from the beacon-sending device UE1.

Figure 2A:
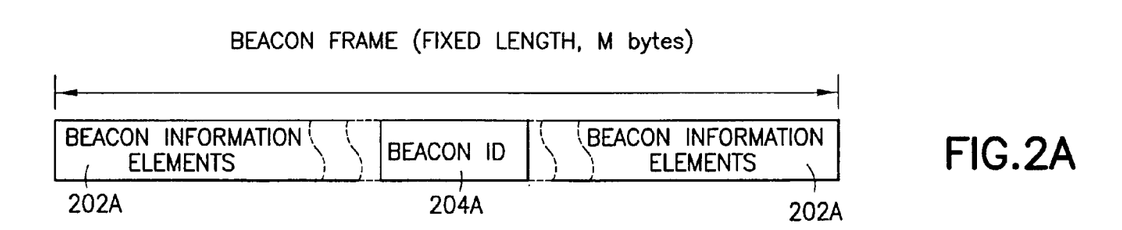
FIG. 2A-B are schematic diagrams showing two different exemplary structures for a beacon frame adapted according to the teachings set forth herein.
Figure 2B:
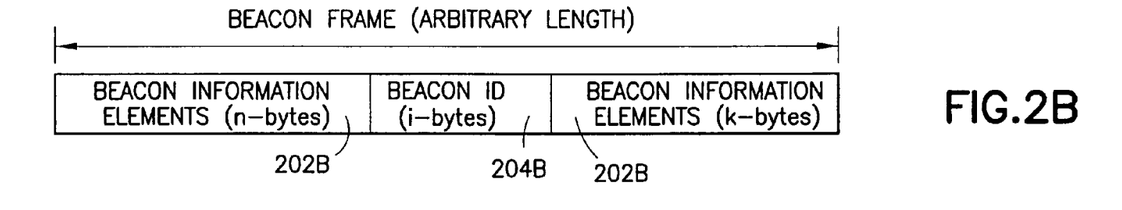
Figure 3A:
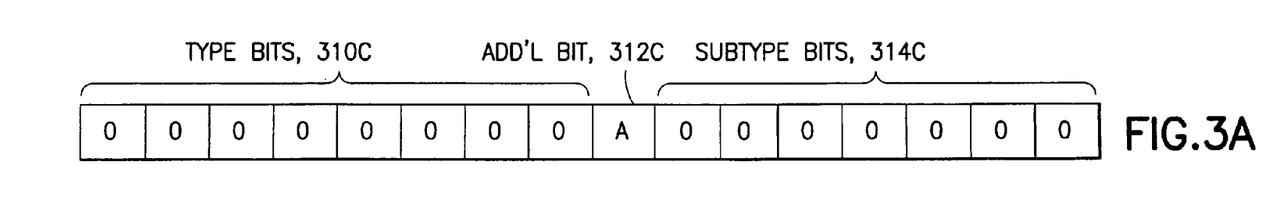
FIGS. 3A-B are schematic diagrams showing two different exemplary implementations of the beacon ID field of the beacon frames shown at FIGS. 2A-B according to the teachings set forth herein
Figure 3B:
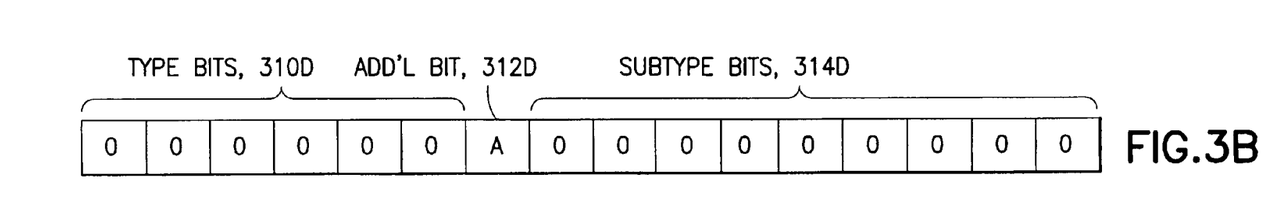

FIGS. 2A-B illustrate two exemplary embodiments of a beacon frame adapted according to these teachings to include a beacon ID field, and FIGS. 3A-B illustrate two exemplary embodiments of the beacon ID field itself. Continuing with the LTE example as the governing RAT, an LTE a radio frame consists of 10 sub-frames each 1 ms in duration. One sub-frame consists of 2 slots which in turn have 7 OFDM symbols each. A beacon frame may be transmitted in one or multiple such sub-frames or slots.

The example at FIG. 2A illustrates a fixed length beacon frame. In this case each field 202A, 204A has a specific length which is known to the receiving devices without explicit information carried in the frame. The new beacon ID field is shown as 204A. The example at FIG. 2B illustrates an arbitrary length beacon frame. The length is indicated in the beacon information elements 202B and the frame size can be dynamic. In this case the beacon ID field 204B can be fixed length, or as illustrated it may be an arbitrary length. The various beacon information elements 202A, 202B can include information such as the sender address, the receiver address, frame length fields, etc. In conventional practice the sender and receiver addresses are MAC addresses. The beacon ID field 204A, 204B is disposed at a predetermined location within the frame, or is indicated by one or more of the various information elements 202A, 202B.

Now consider the exemplary but non-limiting structures for the beacon ID field shown at FIGS. 3A-B. Beacon messages are categorized based on the utilized service (device discovery, unicast/multicast, control signaling, etc.) and according to these teachings there are assigned specific ID groups for different services. In an exemplary embodiment such services can be further distinguished according to subtype by using different portions of the beacon ID field 204A, 204B. Separation of portions of the beacon ID field may be indicated by a single bit as in the examples below, by multiple bits, or the separation may be known to both receiver and transmitter prior to the frame being sent (e.g., at bit position x if the beacon ID 204A is fixed length, or known to occur at x bits from one end of the beacon ID field 204B if it is an i-byte variable length field).

In these embodiments the type portion 310C, 310D of the beacon ID field indicates the content type as is detailed above by example (device discovery, unicast/multicast, etc.), and the network may define how many bits are used for that portion. In both FIGS. 3A-B there are 16 available bit positions in the beacon ID field. In FIG. 3A the network has defined eight bits for the type portion 310C and in FIG. 3B the network has defined six bits for the type portion 310D. Assuming a single bit A 312C, 312D as indicating separation of the type portion from the subtype portion, then that leaves seven bits for the sub-type portion 314C in FIG. 3A and nine bits for the sub-type portion 314D in FIG. 3B. The network may define the length of this sub-type portion 314C, 314D also, in either the fixed length beacon ID field 204A or the variable length beacon ID field 204B. As indicated above, the sub-type portions 314C, 314D may be used to signal transmit power, either relative (high, low) or quantitatively if there are sufficient bits available in the sub-type portion 314C, 314D. Sub-type bits not used for such transmit power purposes may be used in relation to the content type bits, so for example if the beacon content type is a commercial advertisement the sub-type bits might distinguish whether it is for a restaurant, for men's or women's fashion, for consumer electronics, and the like.

The D2D beacon message IDs can be implemented in the MAC layer. Upon receiving the beacon with a certain beacon ID such as RNTI the MAC layer entity at the receiving device UE2, UE3, UE4 can decide whether to further process the message. For example, a receiving D2D device may read the RNTI of a received message, decide it is not a trusted D2D device, and refrain from further processing it. Where the beacon ID serves to filter out such a message from further processing at the receiving UE, the end result is to prevent the forwarding of unwanted packets to the higher layer of that receiving UE which further consumes processing power. In one embodiment the beacon ID has the length of an RNTI (or if a RAT other than UTRAN/LTE the length of the network assigned temporary identifier). This is not a limiting factor though; the beacon ID may be implemented with a different length than the RNTI.

One technical effect of these teachings is that when implemented for D2D device discovery at least, these teachings enable a fast discovery which occurs at lower processing layers of the communication protocol stack and thereby saving processing power at the receiving device by filtering out unwanted beacons from further processing in higher layers. Such filtering of the discovery messages additionally improves the battery life of beacon-receiving UE.

Figure 4:
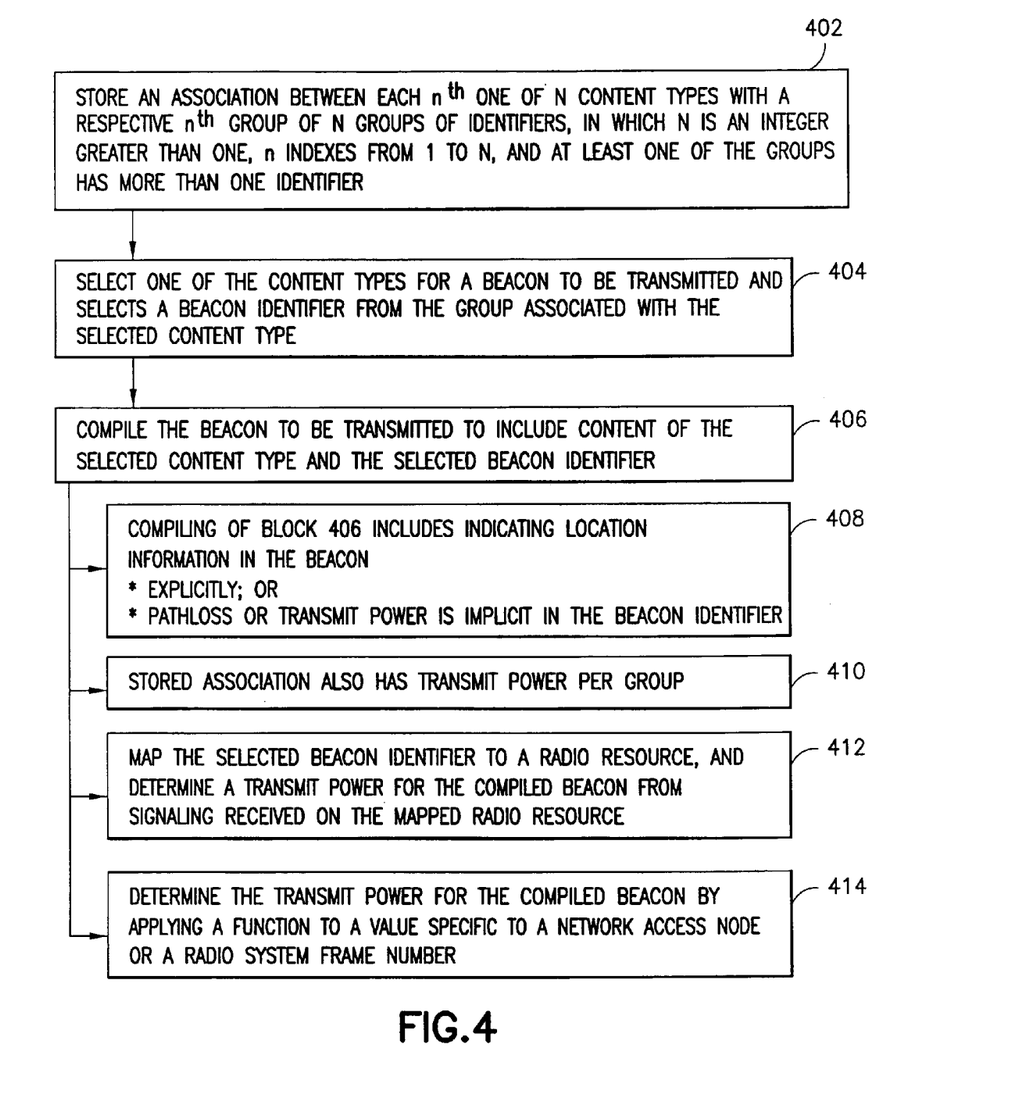
FIGS. 4-6 are logic flow diagrams illustrating the operation of a method, and a result of execution of computer program instructions embodied on a computer readable memory, for practicing exemplary embodiments of these teachings from the perspective of various devices shown at FIGS. 1 and 7.
Figure 5:
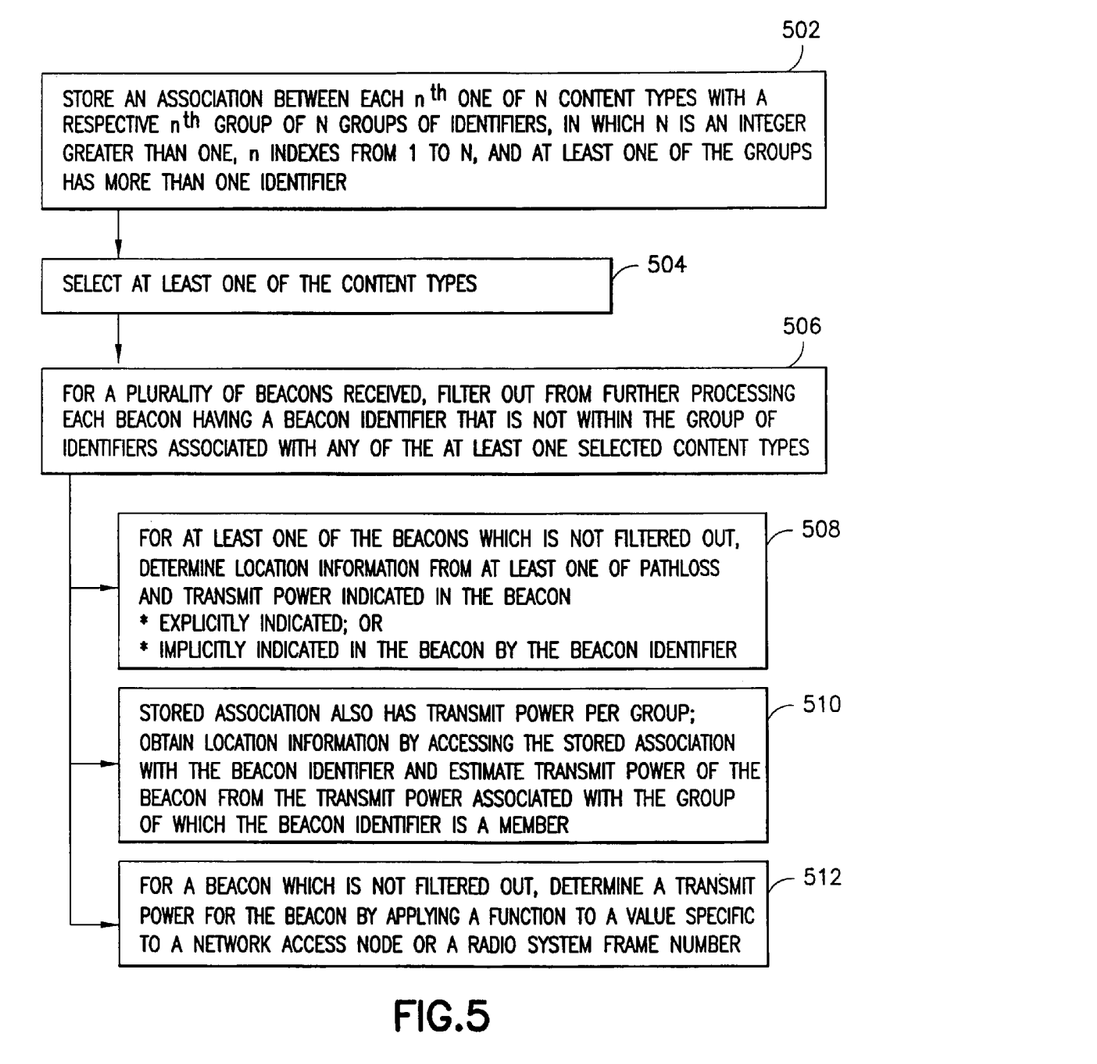
Figure 6:
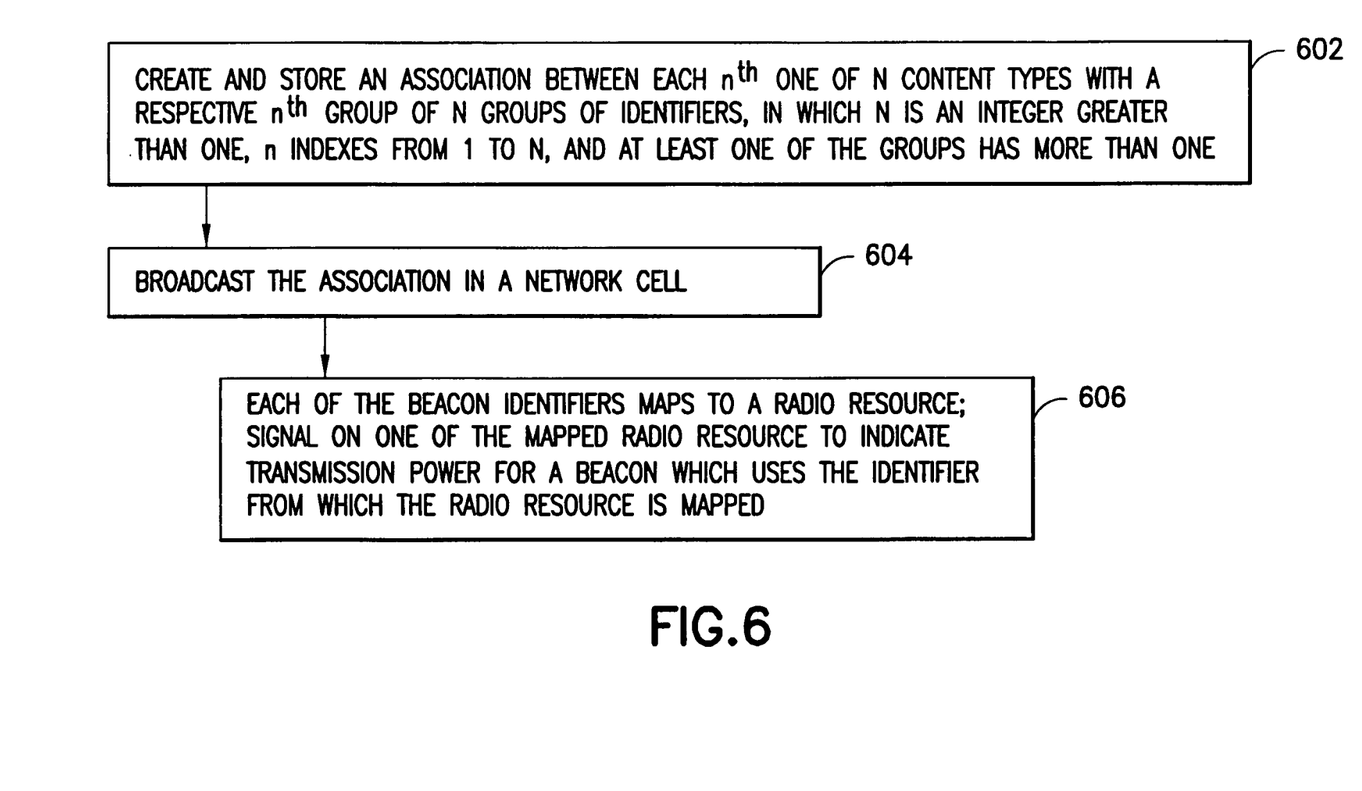

FIGS. 4-6 are logic flow diagrams which may be considered to illustrate the operation of a method, and a result of execution of a computer program stored in a computer readable memory, and a specific manner in which components of an electronic device are configured to cause that electronic device to operate. The various blocks shown in FIG. 4 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

FIG. 4 details particular exemplary embodiments of the invention from the perspective of the beacon-sending device UE1 (or one or more components thereof, more generally termed an apparatus which may or may not be the entire UE1). At block 402 of FIG. 4 the apparatus stores in its computer readable memory an association between each $n^{th}$ one of N content types with a respective $n^{th}$ group of N groups of identifiers, in which N is an integer greater than one, n indexes from 1 to N, and at least one of the groups has more than one identifier. Then at block 404 it selects one of the content types for a beacon to be transmitted and selects a beacon identifier from the group associated with the selected content type. Finally at block 406 it compiles the beacon to be transmitted to include content of the selected content type and the selected beacon identifier. Compiling here simply means filling in the various fields of the beacon frame with the relevant information as detailed above for FIGS. 2A-B.

Further portions of FIG. 4 are optional and may or may not be combined with one another in various embodiments. As noted above, the association may be fixed as in a published wireless protocol, or it may be provided to the UE1 by the network/eNB 22 (more generally an access node) such as by being broadcast in system information. Block 408 describes that compiling the beacon further comprises indicating location information in the beacon. In one embodiment above this location information was an indication of pathloss or transmit power. While that indication might in some embodiments be explicit, in other embodiments it might be implicit by the beacon identifier that is selected from the group associated with the selected content type.

Block 410 has the further embodiment in which the stored association additionally comprises an $n^{th}$ transmit power associated with each of the N groups. Not all transmit powers per group must differ, but the respective transmit powers associated with at least two of the N groups are different from one another in this embodiment. In another embodiment each group has associated a different transmit power.

Block 412 has the embodiment from above in which the UE1 maps the selected beacon identifier to a radio resource, and determines a transmit power for the compiled beacon from signaling received (from the network) on the mapped radio resource.

Block 414 summarized the embodiment in which the UE1 determines the transmit power for the compiled beacon by applying a function to a value specific to a network access node or a radio system frame number (for example, SFN modulo X, where X is cell-specific).

FIG. 5 details particular exemplary embodiments of the invention from the perspective of the beacon-receiving device UE2, UE3 or UE4 (or one or more components thereof, more generally termed an apparatus which may or may not be an entire UE). At block 502 the apparatus stores in its computer readable memory an association between each $n^{th}$ one of N content types with a respective $n^{th}$ group of N groups of identifiers, in which N is an integer greater than one, n indexes from 1 to N, and at least one of the groups has more than one identifier. At block 504 the UE selects at least one of the content types (for example, whichever content type it is interested in receiving), and at block 506, for a plurality of beacons received the UE filters out from further processing each beacon having a beacon identifier that is not within the group of identifiers associated with any of the at least one selected content types. If the UE is interested in receiving only one content type then there is only one group of beacon IDs to filter in and all others are filtered out.

Further portions of FIG. 5 are optional and may or may not be combined with one another in various embodiments. At block 508, for at least one of the beacons which is not filtered out, the UE determines location information from at least one of pathloss and transmit power indicated in the beacon. As above, this pathloss or transmit power may be indicated implicitly in the beacon by the beacon identifier itself, or explicitly.

For the embodiment in which the stored association further comprises an $n^{th}$ transmit power associated with each $n^{th}$ one of the N groups, block 510 has the embodiment in which the UE obtains location information by accessing the stored association with the beacon identifier and estimating transmit power of the beacon from the transmit power associated with the group of which the beacon identifier is a member.

Or at block 512 the UE can, for a beacon which is not filtered out, determine a transmit power for the beacon by applying a function to a value specific to a network access node or a radio system frame number (for example, SFN modulo X, where X is cell-specific).

FIG. 6 details particular exemplary embodiments of the invention from the perspective of the network access node/eNB 22 (or one or more components thereof, more generally termed an apparatus which may or may not be an entire access node). At block 602 the eNB creates, and stores in its computer readable memory, an association between each $n^{th}$ one of N content types and a respective $n^{th}$ group of N groups of identifiers, in which N is an integer greater than one, n indexes from 1 to N, and at least one of the groups has more than one identifier. Then in this embodiment at block 604 the eNB broadcasts the association in a network cell.

As with the UE descriptions above the association in certain exemplary embodiments may further have an $n^{th}$ transmit power associated with each of the N groups, such that the associated transmit powers for at least two of the N groups are different from one another.

For the embodiment in which the beacon identifier maps to a radio resource, block 606 tells that from the eNB perspective each of the beacon identifiers maps to a radio resource and the eNB sends signaling on one of the mapped radio resource which indicates transmission power for a beacon which uses the identifier from which the radio resource is mapped.

Figure 7:
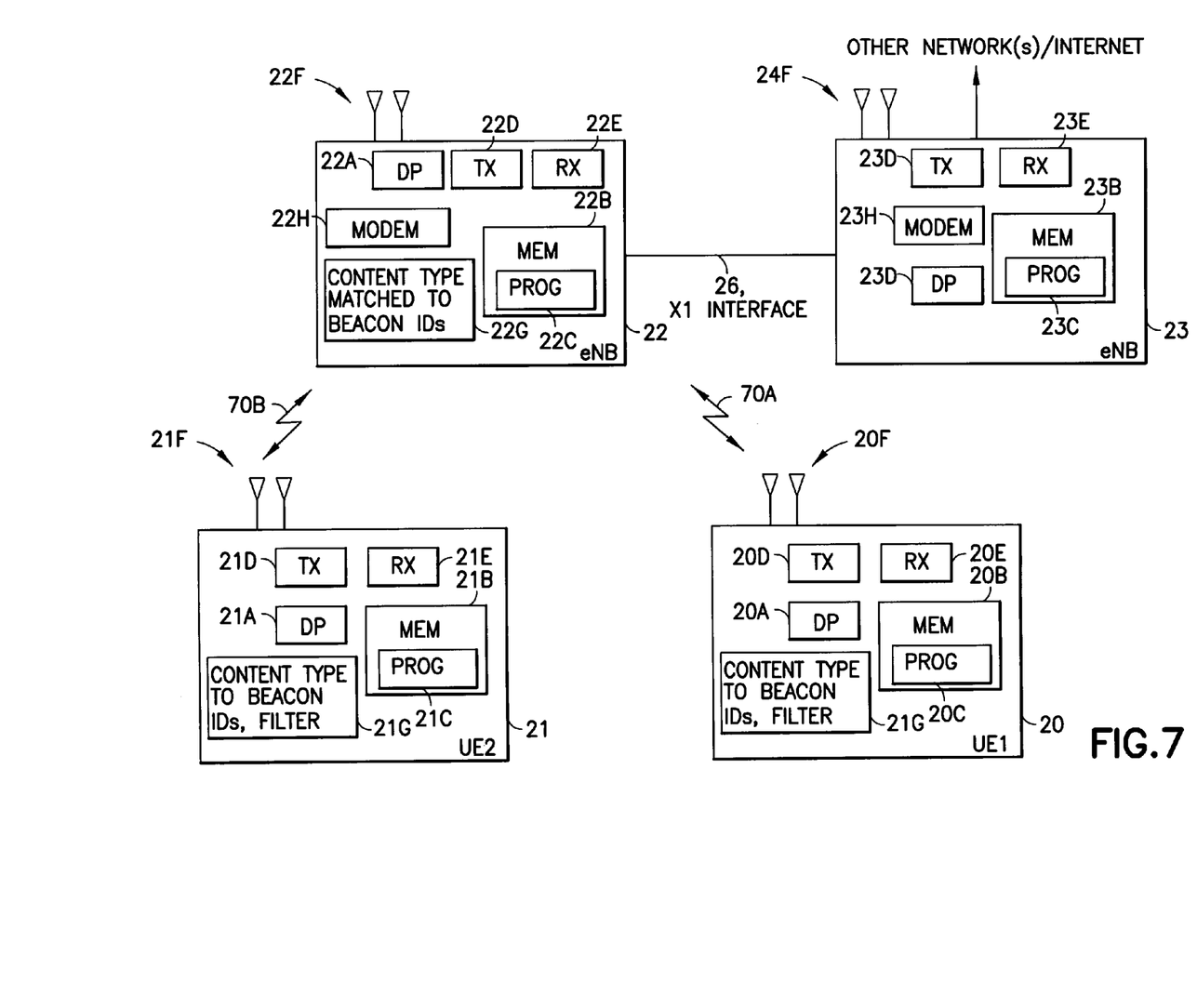
FIG. 7 is a simplified block diagram of some of the devices shown at FIG. 1 which are exemplary electronic devices suitable for use in practicing the exemplary embodiments of this invention.

Reference is now made to FIG. 7 for illustrating a simplified block diagram of various electronic devices and apparatus that are suitable for use in practicing the exemplary embodiments of this invention. In FIG. 7 there is a first network access node/eNB 22 coupled via an X1 interface to a second network access node/eNB 23, of which the former is shown as adapted for communication over wireless links 70A, 70B with two apparatus 20, 21, such as mobile terminals or termed more generally as user equipments UEs. The access nodes 22, 23 may be further communicatively coupled to further networks (e.g., a publicly switched telephone network PSTN and/or a data communications network/Internet), possibly via a higher network node such as a serving gateway in the case of the LTE system.

The first UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the node B 22 via one or more antennas 20F. Within the memory 20B of the first UE 20 is also the association 20G of content type with specific beacon ID groups as was detailed above which the UE 20 uses to filter those beacons which it transmits and those it receives. The second UE 21 is similarly functional with blocks 21A, 21B, 21C, 21D, 21F and 21G.

The first access node 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with its associated user devices 20, 21 via one or more antennas 22F and a modem 22H. The first access node 22 also has stored in its memory the association 22G of content type with specific beacon ID groups as was detailed above which the access node 22 uses to enforce beacon filtering by the UEs 20, 21. In one embodiment this association 22G is created by the access node 22.

The second access node 23 is similarly functional with blocks 23A, 23B, 23C, 23D, 23F and 23H. The second access node 23 may have its own association of content type to beacon IDs but is not shown since it may or may not be identical to that of the first access node in all embodiments of these teachings.

While not particularly illustrated for the UEs 20, 21, those devices are also assumed to include as part of their wireless communicating means a modem which may in one exemplary but non limiting embodiment be inbuilt on an RF front end chip so as to carry the respective TX 20D/21D and RX 20E/21E.

At least one of the PROGs 20C, 21C, 22C in the UEs 20, 21 and in the first access node 22 is assumed to include program instructions that, when executed by the associated DP 20A, 21A, 22A, enable the device to operate in accordance with the exemplary embodiments of this invention as detailed more fully above. In this regard the exemplary embodiments of this invention may be implemented at least in part by computer software stored on the MEM 20B, 21B, 22B which is executable by the DP 20A, 21A, 22A of the respective devices 20, 21, 22; or by hardware; or by a combination of tangibly stored software and hardware (and tangibly stored firmware). Electronic devices implementing these aspects of the invention need not be the entire UE 20, 21 or access node 22, but exemplary embodiments may be implemented by one or more components of same such as the above described tangibly stored software, hardware, firmware and DP, or a system on a chip SOC or an application specific integrated circuit ASIC or a digital signal processor DSP or a modem or a subscriber identity module commonly referred to as a SIM card.

Various embodiments of the UE 20, 21 can include, but are not limited to: cellular telephones; data cards, USB dongles, personal portable digital devices having wireless communication capabilities including but not limited to laptop/palmtop/tablet computers, digital cameras and music devices, and Internet appliances. Other embodiments of the described UE 20, 21 may be implemented as a M2M device which may not have a user interface directly but instead be remotely disposed for user-free operation.

Various embodiments of the computer readable MEM 20B, 21B, 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 20A, 21A, 22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the WLAN and LTE systems, it should be appreciated that the exemplary embodiments of this invention are not limited for use with only this one particular type of wireless communication system, and that they may be used to advantage in other wireless communication systems such as for example UTRAN, WCDMA and others.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method performed by user equipment, the method comprising:
storing, in a memory, an association between each $n^{th}$ one of N content types with a respective $n^{th}$ group of N groups of identifiers, in which N is an integer greater than one, n indexes from 1 to N, and at least one of the N groups of identifiers has more than one identifier, in which the content types comprise at least device-to-device (D2D) control information, D2D discovery information and D2D unicast/multicast information;
selecting, by circuitry of the user equipment, one of the content types for a beacon frame to be transmitted;
selecting, by the circuitry, a beacon frame identifier from the group associated with the selected content type; and
compiling the beacon frame to be transmitted to include content of the selected content type, the selected beacon frame identifier and an indication of location information of the user equipment by one of path loss and transmit power for the beacon frame, wherein
the one of pathloss and transmit power for the beacon frame is indicated by the beacon flame identifier that is selected from the group associated with the selected content type.

2. The method according to claim 1, wherein the association between each $n^{th}$ one of N content types with the respective $n^{th}$ group of the N groups of identifiers is received from a network access node and stored in the memory thereafter.

3. The method according to claim 1, wherein the stored association further comprises an $n^{th}$ transmit power associated with each of the N groups, such that the associated transmit powers for at least two of the N groups are different from one another.

4. The method according to claim 1, further comprising:
mapping the selected beacon frame identifier to a radio resource; and
determining a transmit power for the compiled beacon frame from signaling received on the mapped radio resource.

5. The method according to claim 1, further comprising:
determining a transmit power for the compiled beacon frame by applying a function to a value specific to a network access node or a radio system frame number.

6. The method according to claim 1, wherein compiling the beacon frame to be transmitted comprises:
inserting the selected beacon frame identifier in a type portion of a beacon frame field; and
inserting a further identifier of a beacon frame sub-type in a sub-type portion of the beacon frame field.

7. The method according to claim 1, wherein the beacon frame is for D2D communications.

8. An apparatus comprising:
a processing system comprising a memory; and
at least one processing circuit configured to
store in the memory an association between each $n^{th}$ one of N content types with a respective $n^{th}$ group of N groups of identifiers, in which N is an integer greater than one, n indexes from 1 to N, and at least one of the N groups of identifiers has more than one identifier, in which the content types comprise at least device-to-device (D2D) control information, D2D discovery information and D2D unicast/multicast information;
select one of the content types for a beacon frame to be transmitted;
select a beacon frame identifier from the group associated with the selected content type; and
compile the beacon frame to be transmitted to include content of the selected content type, the selected beacon frame identifier, and an indication of location information of the apparatus by one of path loss and transmit power for the beacon frame, wherein
the one of pathloss and transmit power for the beacon frame is indicated by the beacon frame identifier that is selected from the group associated with the selected content type.

9. The apparatus according to claim 8, wherein the association between each $n^{th}$ one of N content types with the respective $n^{th}$ group of the N groups of identifiers is received from a network access node and stored in the memory thereafter.

10. The apparatus according to claim 8, wherein the stored association further comprises an $n^{th}$ transmit power associated with each of the N groups, such that the associated transmit powers for at least two of the N groups are different from one another.

11. The apparatus according to claim 8, wherein the processing circuit is further configured to
map the selected beacon identifier to a radio resource; and
determine a transmit power for the compiled beacon frame from signaling received on the mapped radio resource.

12. The apparatus according to claim 8, wherein the processing circuit is further configured to
determine a transmit power for the compiled beacon frame by applying a function to a value specific to a network access node or a radio system frame number.

13. The apparatus according to claim 8, wherein the processing circuit is further configured to
insert the selected beacon frame identifier in a type portion of a beacon frame field; and
insert a further identifier of a beacon frame sub-type in a sub-type portion of the beacon frame field.

14. The apparatus according to claim 8, wherein the processing circuit is further configured to transmit beacon frame via D2D communication.

15. A non-transitory computer readable medium storing computer readable instructions executable by at least one processing circuit of a user equipment, such that when executed by the processing circuit, cause the processing circuit to:
store, in the non-transitory computer readable medium, an association between each $n^{th}$ one of N content types with a respective $n^{th}$ group of N groups of identifiers, in which N is an integer greater than one, n indexes from 1 to N, and at least one of the N groups of identifiers has more than one identifier, in which the content types comprise at least device-to-device (D2D) control information, D2D discovery information and D2D unicast/multicast information;

select one of the content types for a beacon frame to be transmitted;

select a beacon frame identifier from the group associated with the selected content type; and compile the beacon frame to be transmitted to include content of the selected content type, the selected beacon frame identifier and an indication of the user equipment by on of path loss and transmit power for the beacon frame, wherein the one of pathloss and transmit power for the beacon frame is indicated by the beacon frame identifier that is selected from the group associated with the selected content type.

16. The non-transitory computer readable medium according to claim 15, wherein the stored association further comprises an $n^{th}$ transmit power associated with each of the N groups, such that the associated transmit powers for at least two of the N groups are different from one another.

17. The non-transitory computer readable medium according to claim 15, wherein the association between each $n^{th}$ one of N content types with the respective $n^{th}$ group of the N groups of identifiers is received from a network access node and stored in the computer readable memory thereafter.

18. The non-transitory computer readable medium according to claim 15, wherein th processing circuit is further caused to:

map the selected beacon frame identifier to a radio resource; and determine a transmit power for the compiled beacon frame from signaling received on the mapped radio resource.

19. The non-transitory computer readable medium according to claim 15, wherein the processing circuit is further caused to:

determine a transmit power for the compiled beacon frame by applying a function to a value specific to a network access node or a radio system frame number.

20. The non-transitory computer readable medium according to claim 15, wherein the processing circuit is further caused to:

insert the selected beacon frame identifier in a type portion of a beacon frame field; and insert a further identifier of a beacon frame sub-type in a sub-type portion of the beacon frame field.

* * * * *